G. B. FRENCH, DEC'D.
B. T. FRENCH, EXECUTRIX.
PROCESS OF PREPARING A STOCK FOOD.
APPLICATION FILED NOV. 21, 1904.
1,105,415. Patented July 28, 1914.
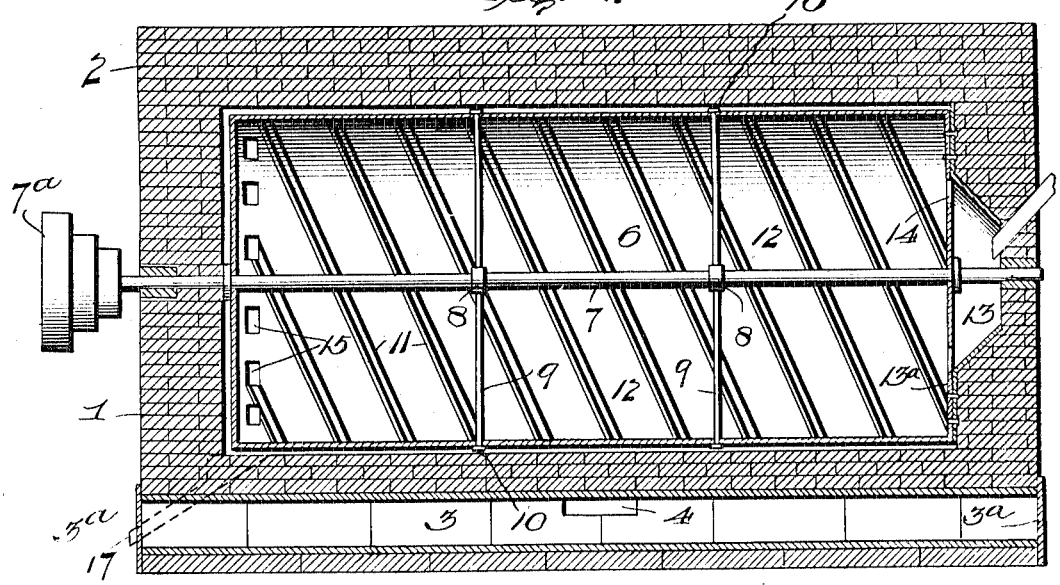
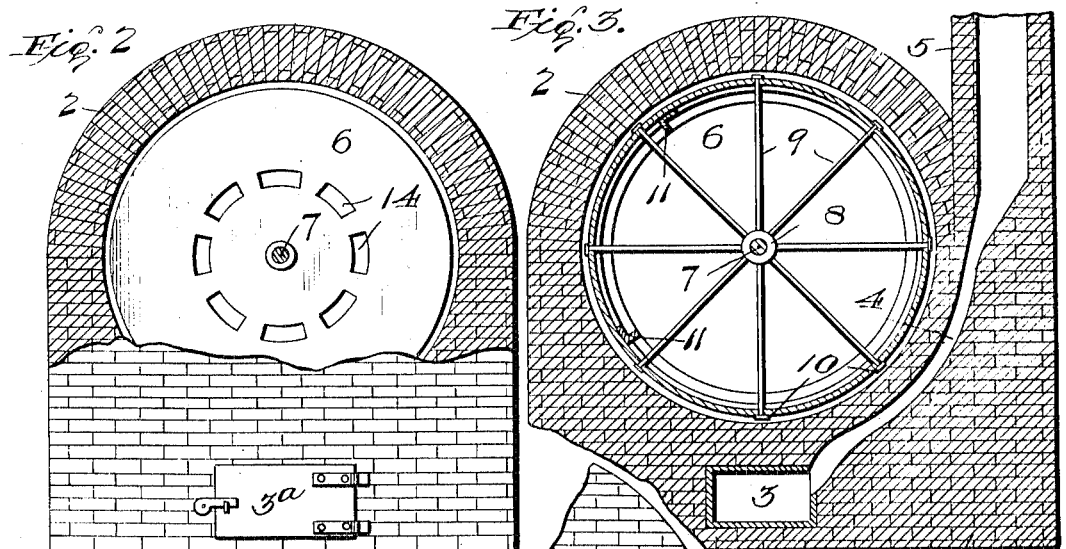
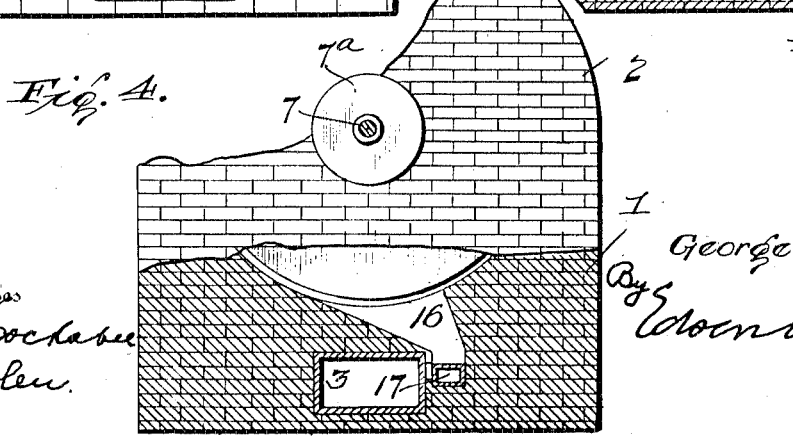
Witnesses
Inventor
George B. French
By Edwin Bro's
Attorneys

UNITED STATES PATENT OFFICE.

GEORGE B. FRENCH, OF FREMONT, NEBRASKA; BELLE T. FRENCH EXECUTRIX OF SAID GEORGE B. FRENCH, DECEASED.

PROCESS OF PREPARING A STOCK FOOD.

1,105,415.   Specification of Letters Patent.   Patented July 28, 1914.

Application filed November 21, 1904. Serial No. 233,730.

*To all whom it may concern:*

Be it known that I, GEORGE B. FRENCH, a citizen of the United States, residing at Fremont, in the county of Dodge and State of Nebraska, have invented certain new and useful Improvements in Processes of Preparing a Stock Food; and I do hereby declare the following to be a full, clear, and exact description of the invention, such as will enable others skilled in the art to which it appertains to make and use the same.

My invention relates to improvements in the preparation of food for domestic animals from the whole Indian corn or maize plant.

It has for its object to save all of the nutritious parts of the entire plant, as the stalk, with its pith, the leaf, silk, tassel, cob and kernel, and incorporate them into a healthy, palatable, and easily digestible form which may be conveniently handled and is capable of retaining its nutritious, healthy, easily digestible and palatable qualities much longer than when the kernel alone is ground into meal or kiln dried, and which when prepared is in such form that it can be readily, cheaply and securely packed, preserved and transported as an article of commerce.

It is a fact well known where Indian corn or maize is grown, and more generally recognized in those States and parts of States which constitute the "corn belt", so called, that a large portion of this crop, that is to say, the stalk with its enveloping husk and tassel, the blade or leaf, the silk and the cob, are wasted for purposes of fodder. The corn is husked or "shucked" in the field, after the frost has loosened the husk from the ear, hauled away and the remainder of the crop is left in the field where a large portion is ruined by the winds and storms of the ensuing winter. Cattle and other stock are sometimes let into the fields after the corn has been removed therefrom, and trample down and complete the destruction of that portion which they do not consume. All the parts of the plants thus wasted and destroyed are valuable for fodder and contain those albuminoids or flesh-forming substances in which the kernel, a carbonaceous and fat-forming food is deficient.

I am aware that besides the old way of preserving corn stover, namely by cutting, stocking and allowing the stocks to remain in the field until the whole crop becomes dry, other methods have been devised whereby to save the crop of corn stover. I refer to the silo and the shredder. Both of these methods are valuable but they must both necessarily be restricted in their utility because neither ensilage or shredded corn stover are in a form to be packed, preserved, easily handled or transported. It is doubtful whether the preparation of these products, *i. e.* corn stover, have sufficient food value to create a demand and command a market without other and more concentrated forms of nourishment being incorporated with them. Corn stover, therefore, either in a shredded or in a siloed form, must be utilized upon the farm, or in the vicinity where the crop is grown.

In the northern portions of the "corn belt" and in fact throughout the entire corn growing region, it is not infrequent that excessively wet weather in the spring delays the planting and germinating of the seed. These conditions in turn delay proper cultivation, encourage weed growth and largely operate to diminish the quality and yield of the crop. Again, early frosts very frequently seriously injure the maturing of the corn even when spring conditions are favorable. The adoption of my invention would minimize the effects of these disasters, because by it all the food value in the corn stover, and what of value there is in the undeveloped and immature kernel, can be saved.

In the accompanying drawings which illustrate the kiln used in the drying step of my process, Figure 1 is a longitudinal sectional view of the kiln. Fig. 2 is an elevation of the receiving end of the kiln, part of the walls of the casing being broken away to show the end of the rotary cylinder. Fig. 3 is a cross sectional view of the kiln showing the flue and chimney, and Fig. 4 is a broken elevation of the discharge end of the kiln showing the discharge hopper and chute.

My method of preparing or manufacturing my new stock food consists in first cutting and then shredding the entire crop. By the entire plant or crop is meant all of the parts of the plant having nutritious value which grow above the ground and can be conveniently harvested. In the shredding process, the cob is cut and broken into small pieces, then is shelled and a large portion of the kernels cut and broken, and the stalk, blade, husk, tassel, silk and pith is reduced to a comparatively fine mass. This step in the process may be accomplished by separate machines or in a combined cutter and shredder, and should so pulverize the whole mass that it becomes quickly and easily susceptible to the influence of heat. The mass is then in such condition that it can be baked or kiln dried at a temperature considerably less than that necessary to bake or boil and in less time than in the ordinary process of kiln drying. The mass is then baked or kiln dried in a suitable oven. This step is necessary to eliminate moisture from the mass so that it may be longer and more easily preserved, to destroy all insect and germ life so that it is more healthy, more nutritious and palatable for stock, and to lessen weight, so that it can be more easily and cheaply packed, handled and transported. This baking or kiln drying process is effected, preferably, in a revoluble oven, hung in a casing of brick and mortar, provided with grates, flues, and a chimney, and so constructed generally that different forms of fuel, such as wood, coal, coke or oils, may be used therein in such a way that the heat may be controlled and kept at the proper temperature. The oven is preferably made of galvanized sheet iron or zinc, is cylindrical in form and has continuous plates or flanges extending spirally in a winding direction from the receiving, to the discharging end, throughout its inner surface, thus forming a channel or groove through which the mass of pulverized corn and corn stover is kept continually moving by the rotary motion of the oven. The outer edges of these inner projecting flanges are preferably cut convex to correspond with the concave inner surface of the oven and bent so as to be properly riveted or otherwise secured to the inside surface of the oven, which is preferably mounted on a shaft extending longitudinally through its center with journals fitting in journal boxes set in the brick oven case. One end of said shaft may carry a pulley whereby motion is imparted to the oven. Around both ends of the oven at any convenient distance between the center and the perimeters thereof, segmental slots are cut for the reception and delivery of the material. A continuous circular disk or bowl may be fixed rigidly to the central part of the receiving end of the oven, extending outwardly and diagonally from the surface thereof constituting a hopper to receive the coarsely cut and shredded mass from the cutter and shredder. A cone-shaped piece may be secured to the other end of the oven to deliver the material which has passed through the oven to a suitable chute or other means of conveyance to be taken to the grinder. While the mass is thus being conveyed through the oven, it is subjected to any required degree of temperature, and is heated, baked, cooked or kiln dried and, being in continuous motion, all its parts are mingled together into a like degree of consistency, is warm, practically devoid of moisture, brittle and in a condition to be ground. The heated, dried or cooked mass is then ground in any feed grinder of proper construction and material, to any desired degree of fineness and is ready for immediate consumption, or it may be packed firmly into sacks of such material that the air is practically excluded, in which condition it can be preserved much longer than corn meal ground in the ordinary way. It can be salted at any stage of the process after it has been cut and shredded, preferably by means of a shaker discharging into the hopper of the grinder. While the addition of salt will not increase the nutritious value of the food which I have designated "maize-meal," except indirectly as adding to its palatable and digestible qualities, it is a convenient way to feed this indispensable compound, and acts as a preservative.

In order to make the preparation and manufacture of maize meal a continuous process, I erect a suitable casing or closure, 1, preferably of brick, concrete or stone, with a semi-circular arch, 2. Extending the whole length of this casing and arch is a narrow furnace or fire box 3, which is also inclosed except at the ends thereof, by the brick casing. Said fire box may be made of iron castings and built into the base of the casing, or it may be, and preferably is, an open space lined with fire brick and constituting a part of the base of the casing. Said fire box is preferably provided with doors, 3ª, at each end, and the flue, 4, and chimney, 5, are arranged near the middle so that fires can extend from both ends toward the middle, and thus secure an even heat along the length of the kiln. In said casing, 1, is hung a revoluble drying or baking oven, 6, which is carried by a shaft, 7, provided with a drive pulley, 7ª, at one end. At proper intervals on said shaft are secured hubs, 8, into which are fastened the ends of radial spokes, 9. The opposite or outer ends of said spokes pass through apertures cut through the surface of the cylinder oven which is attached to the outer ends of said radial spokes by means of nuts, 10, turned and headed on to the ends thereof on the outside. It should be understood that the shaft, 7, with the hubs, 8, and the radial spokes, 9, are rigidly connected together and constitute the frame work of the oven which is entirely inclosed by the casing. The kiln has continuous plates or flanges, 11, extending spirally from the receiving to the discharging end thereof, throughout its inner surface. These plates or flanges are substantially partitions forming grooves or channels, 12, through which the material is kept moving by the rotary motion of the cylinder. The circular inlet disk or bowl, 13, is shaped like a truncated cone, is hollow and open at both ends, but has the edges of its base bent outward as at 13ª, to correspond and fit to the plane surface of the receiving end of the cylinder to which it is riveted just outside the circumferential edges of the inlet slots, 14, in the end of said cylinder. There are similar slots, 15, cut at proper intervals along the circumference of the cylinder near its discharging end, through which the material is discharged into the cone-shaped box or hopper, 16, from which it falls into the outlet chute, 17, and is discharged thence into a suitable receptacle (not shown) and carried by an elevator, or otherwise, to the grinder. The drying of the material in the kiln may be regulated or controlled by the size of the fire, the depth of the passages or grooves in the cylinder and by increasing or diminishing the speed of the revolutions of the cylinder.

It will, of course, be understood that when it is desired to utilize the corn crop or any portion thereof for immediate consumption on the farm where it is grown or in the immediate vicinity, it is not necessary to cook, bake and kiln dry the product as it is not required that the food be preserved. In such cases the material is cut and shredded and passed directly to the grinder and ground substantially in the manner heretofore indicated. The product will then contain all the nutritive value and all the moisture there is in the crop provided no portion of the ear is removed.

The great advantage of my process is that whatever the condition of the crop, the farmer can by the use of said process, save and utilize for food purposes, all there is of nutritive value in his crop.

It is obvious that my process may be successfully used in the preparation of similar foods from food plants other than Indian corn.

My stock food is composed of proportional constituent parts of ash, protein, crude fiber, nitrogen free extract and fat. It is obvious that the per cent. of these constituent parts will vary according to location, culture, character of the soil, climate, variety, stage of development and manner of curing in fresh or air dry material. As above stated, it is not necessary to dry the food when it is to be used at once, whereas if it is to be preserved it must be dried. The composite matter of the two would vary. Allowing for the conditions specified, the food would contain approximately from 12.2 to 40.5 per cent. water, from 1.4 to 4.2 per cent. ash. from 4 to 10.4 per cent. protein (N x 6.25), from 9 to 19.9 per cent. crude fiber, from 41.4 to 62.2 per cent. nitrogen free extract and from 1.7 to 3.5 per cent. fat. Average proportions may be stated as follows, calculating to water free substance, namely: 3.5 per cent. ash, 8.3 per cent. protein, 19.4 per cent. crude fiber, 65.8 per cent. nitrogen free extract and 3.1 per cent. fat. The substances named as the constituent parts of the food are those used by chemists in analyzing food stuffs.

Having thus described my invention, what I claim as new and desire to secure by Letters Patent is:

1. The process of preparing a stock food consisting in cutting and shredding all the parts of a food plant which grow above the ground and have nutritious qualities, and grinding the cut and shredded mass into a comminuted form.

2. The process of preparing a stock food consisting in cutting and shredding all the parts of a food plant which grow above the ground and have nutritious qualities, drying the cut and shredded mass and grinding the dried product into a comminuted form.

3. The process of preparing a stock food consisting in cutting and shredding all the parts of a food plant which grow above the ground and have nutritious qualities, salting and drying the cut and shredded mass and grinding the dried product into a comminuted form.

4. The process of preparing a stock food consisting in cutting and shredding all the parts of an Indian corn plant which grow above the ground and have nutritious qualities, drying the cut and shredded mass, and grinding the dried product into a comminuted form.

5. The process of preparing a stock food which consists in cutting and shredding all parts of a food plant which grow above the ground and have nutritious qualities, drying the cut and shredded mass under agitation, and then grinding the dried product into a comminuted form.

In testimony whereof, I affix my signature, in presence of two witnesses.

GEORGE B. FRENCH.

Witnesses:
A. K. DAME,
CLARENCE LUCAS.